United States Patent
Ohmori et al.

(10) Patent No.: US 9,238,464 B2
(45) Date of Patent: Jan. 19, 2016

(54) VEHICLE TRAVEL ASSISTANCE DEVICE

(71) Applicant: ADVICS CO., LTD., Kariya (JP)

(72) Inventors: Yosuke Ohmori, Chiryu (JP); Yukio Mori, Nagoya (JP); Masaki Shiota, Anjyo (JP); Masayoshi Takeda, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/407,431

(22) PCT Filed: Jun. 13, 2013

(86) PCT No.: PCT/JP2013/066351
§ 371 (c)(1),
(2) Date: Dec. 11, 2014

(87) PCT Pub. No.: WO2013/187475
PCT Pub. Date: Dec. 19, 2013

(65) Prior Publication Data
US 2015/0151755 A1 Jun. 4, 2015

(30) Foreign Application Priority Data

Jun. 13, 2012 (JP) .................................. 2012-133971

(51) Int. Cl.
*B60T 8/32* (2006.01)
*B60W 30/14* (2006.01)
(Continued)

(52) U.S. Cl.
CPC ............... *B60W 30/143* (2013.01); *B60T 7/12* (2013.01); *B60T 7/22* (2013.01); *B60T 2201/022* (2013.01)

(58) Field of Classification Search
CPC ............................... B60W 30/143; B60T 7/12
USPC .............................................. 701/93, 96, 301
See application file for complete search history.

(56) References Cited

U.S. PATENT DOCUMENTS 8,078,383 B2 * 12/2011 Isaji et al. ........................ 701/96
8,676,443 B2 * 3/2014 Han et al. ........................ 701/42
(Continued)

FOREIGN PATENT DOCUMENTS

JP 52-069132 A 6/1977
JP 05-225499 A 9/1993
(Continued)

OTHER PUBLICATIONS

English language translation of International Preliminary Report on Patentability (Forms PTO/IB/373 and PCT/ISA/237) and the Written Opinion of the International Searching Authority issued on Dec. 16, 2014, by the International Bureau of WIPO in corresponding International Application No. PCT/JP2013/066351. (6 pages).
(Continued)

*Primary Examiner* — Thomas G Black
*Assistant Examiner* — Luke Huynh
(74) *Attorney, Agent, or Firm* — Buchanan Ingersoll & Rooney PC

(57) ABSTRACT

An ECU calculates: a free running distance, which is a distance that a vehicle can travel from a first time point at which a speed-reduction control is started to a second time point at which the relative deceleration begins to increase by the start of the speed-reduction control; an increase travel distance, which is a distance that the vehicle can travel from the second time point to a third time point at which the relative deceleration reaches the target relative deceleration; and a post-completion travel distance, which is a distance that the vehicle can travel from the third time point to a time point at which the relative speed is made equal to or less than the specified speed. The ECU obtains a speed reduction distance based on a result of adding up the free running distance, the increase travel distance, and the post-completion travel distance.

7 Claims, 5 Drawing Sheets

(51) Int. Cl.
*B60T 7/22* (2006.01)
*B60T 7/12* (2006.01)

(56) References Cited

U.S. PATENT DOCUMENTS

2001/0004028 A1* 6/2001 Sato et al. .................... 180/169
2006/0152350 A1* 7/2006 Swoboda et al. ............. 340/435

FOREIGN PATENT DOCUMENTS

| JP | 07-146364 A | 6/1995 |
| JP | 08-310359 A | 11/1996 |
| JP | 10-177073 A | 6/1998 |
| JP | 2003-016597 A | 1/2003 |
| JP | 2004-291667 A | 10/2004 |

OTHER PUBLICATIONS

International Search Report (PCT/ISA/210) mailed on Sep. 17, 2013, by the Japanese Patent Office as the International Searching Authority for International Application No. PCT/JP2013/066351.

* cited by examiner

VEHICLE TRAVEL ASSISTANCE DEVICE

TECHNICAL FIELD

The present invention relates to a vehicle travel assist apparatus.

BACKGROUND ART

There have been developments of a travel assist apparatus for avoiding collision between a vehicle and a collision avoidance object such as a preceding vehicle present ahead of the first vehicle in a traveling direction. In the above-described device, a speed reduction distance, which is an estimated value of travel distance necessary for stopping the vehicle on the assumption that speed-reduction control for reducing the speed of the vehicle is started at the current time point, is compared with a relative distance between the host vehicle and the collision avoidance object measured by a radar installed in the host vehicle. Then, when the thus detected latest relative distance is equal to or less than an addition value obtained by adding a specified distance (greater than 0 (zero)) to the speed reduction distance, the speed-reduction control is actually started.

A method for calculating the above-described speed reduction distance includes a method for calculation using the relational expression 1 given below (refer to Patent Document 1, for example).

$$R = (VSa^2)/(2 \cdot a) \quad \text{(Expression 1)}$$

where R represents speed reduction distance; VSa represents speed of vehicle; a represents estimated deceleration on performance of speed-reduction control

PRIOR ART DOCUMENTS

Patent Documents

Patent Document 1: Japanese Laid-Open Patent Publication No. 52-69132

SUMMARY OF THE INVENTION

Problems that the Invention is to Solve

When the above-described speed-reduction control is started, it takes some time before the actual deceleration of the host vehicle reaches an estimated deceleration α. Therefore, even at the start of the speed-reduction control, there is a high probability that the actual speed reduction distance may be longer than a speed reduction distance R, which is calculated by using the above-described relational expression 1. Thus, in order to avoid collision between the host vehicle and the collision avoidance object by performance of the speed-reduction control, it is preferable that the specified distance is set to be a relatively great value. However, in this case, a relative speed of the host vehicle with respect to the collision avoidance object (relative speed=speed of host vehicle−movement speed of collision avoidance object) can be 0 (zero) before reaching the collision avoidance object. Nevertheless, there is a fear that the speed-reduction control may be started at too early timing.

The above-described problems are present not only in such a case where the relative speed is made into 0 (zero) by performing the speed-reduction control, but also in such a case where the relative speed is made equal to or less than a specified speed set to be a value greater than 0 (zero) at a target position set forward from an object present ahead of the vehicle in the traveling direction by performing the speed-reduction control.

An objective of the present invention is to provide a vehicle travel assist apparatus that is capable of calculating, with improved accuracy, a speed reduction distance, which is an estimated value of travel distance necessary for making a relative speed of a host vehicle equal to or less than a specified speed.

Means for Solving the Problems

To achieve the foregoing objective and in accordance with one aspect of the present invention, a vehicle travel assist apparatus is provided that performs speed-reduction control in which a relative deceleration (Gr) of a vehicle with respect to an object (C2) present ahead of the vehicle in a traveling direction is increased to a target relative deceleration (At), thereby calculating a speed reduction distance (Xth), which is an estimated value of a travel distance of the vehicle necessary for making a relative speed (Vr) of the vehicle with respect to the object (C2) equal to or less than a specified speed (Vth). With a point in time at which the speed-reduction control is started defined as a first time point, an estimated value of a distance that the vehicle can travel from the first time point to a second time point, at which the relative deceleration (Gr) begins to increase by the start of the speed-reduction control at the first time point, is calculated (S26) as a free running distance (X0). An estimated value of a distance that the vehicle can travel from the second time point to a third time point, at which the relative deceleration (Gr) reaches the target relative deceleration (At), is calculated (S27) as an increase travel distance (X1). An estimated value of a distance that the vehicle can travel from the third time point to a time point at which the relative speed (Vr) is made equal to or less than the specified speed (Vth) is calculated (S28) as a post-completion travel distance (X2). The speed reduction distance (Xth) is obtained (S29) based on a result of adding up the free running distance (X0), the increase travel distance (X1), and the post-completion travel distance (X2), which have been thus calculated.

If the speed-reduction control is started at a certain time point (first time point), the relative deceleration (Gr) actually begins to increase due to the performance of the speed-reduction control after the elapse of a certain period of time from the start of the control. Then, when the increase in the relative deceleration (Gr) to reach the target relative deceleration (At), the relative deceleration (Gr) is substantially constant during the performance of the speed-reduction control.

Thus, in the present invention, for a while from the start of the speed-reduction control (first time point), the free running distance (X0) is calculated as an estimated value of travel distance of the vehicle from the first time point to the second time point, at which the relative deceleration (Gr) is assumed to start increasing by performance of the speed-reduction control. Further, on the assumption that from the second time point, the relative deceleration (Gr) is increased up to the target relative deceleration (At) at a constant gradient, the increase travel distance (X1) is calculated as an estimated value of the travel distance of the vehicle from the second time point to the third time point, at which the relative deceleration (Gr) is assumed to reach the target relative deceleration (At). Still further, on the assumption that the relative deceleration (Gr) is constant from the third time point, the post-completion travel distance is calculated as an estimated value of the travel distance of the vehicle from the third time point to a time point at which the relative speed (Vr) is assumed to be equal to or less than a specified speed (Vth).

Then, the free running distance (X0), the increase travel distance (X1) and the post-completion travel distance (X2), which have been calculated as described above, are added together. The speed reduction distance (Xth) is obtained from the thus added result. Thus, as compared with such a case where the speed reduction distance is calculated based on the above-described relational expression 1, the speed reduction distance (Xth) is calculated with increased accuracy, while taking into consideration a time lag between the start of the speed-reduction control and the start of the actual increase in deceleration of the vehicle or the like.

With a period of time from the first time point to the second time point defined as a free running period (Td), the free running distance (X0) can be calculated (S26) based on the relative speed (V0) at the first time point, the relative deceleration (A0) at the first time point, and the free running period (Td).

With a period of time from the second time point to the third time point defined as an increase time period (T1) and a gradient of change of the relative deceleration (Gr) at the increase time period (T1) defined as a target relative deceleration change amount (Jt), the increase travel distance (X1) can be calculated (S27) based on the relative speed (V1) at the second time point, the relative deceleration (A0) at the first time point, the increase time period (T1), and the target relative deceleration change amount (Jt). The "relative speed at the second time point (V1)" is an estimated value of the relative speed at a time point (second time point), at which the vehicle has travelled from the first time point only by the free running distance (X0).

With a period of time from the second time point to the third time point defined as an increase time period (T1) and a gradient of change of the relative deceleration (Gr) at the increase time period (T1) defined as a target relative deceleration change amount (Jt), the post-completion travel distance (X2) can be calculated (S28) based on the relative speed (V2) at the third time point and the target relative deceleration (At). In addition, the "relative speed at the third time point (V2)" is an estimated value of the relative speed at a time point (third time point) at which the free running period (Td) and the increase time period (T1) have passed from the first time point.

The speed-reduction control preferably includes control for increasing a brake torque applied to the vehicle. When the carried load (MGmass) of the vehicle can be obtained (S12), the speed reduction distance (Xth) is preferably made longer when the vehicle is traveling in a state in which the carried load (MGmass) is high than when the vehicle is traveling in a state in which the carried load (MGmass) is low.

Speed reduction characteristics of the vehicle at the time of brake application change depending on the carried load (MGmass) of the vehicle. Therefore, adoption of the above-described configuration allows the speed reduction distance (Xth) to be defined as a value according to the carried load (MGmass) of the vehicle at that time point. Thereby, it is possible to calculate the speed reduction distance (Xth) according to the speed reduction characteristics of the vehicle at that time.

A relative distance (Xr) between the host vehicle (C1) and the object (C2) is obtained (S13). When the thus obtained relative distance (Xr) becomes equal to or less than a control start determination distance (Xsta), which is based on the obtained speed reduction distance (Xth) (S15:YES), the speed-reduction control is preferably started (S16). In accordance with the above-described configuration, the speed reduction distance (Xth) is calculated with improved accuracy, and the control start determination distance (Xsta) is also calculated with improved accuracy. It is, therefore, possible to start the speed-reduction control at an appropriate timing.

In order to provide a better understanding of the present invention, a description has been given of the embodiment by using corresponding reference numerals. As a matter of course, the present invention is not limited to the embodiment.

MODES FOR CARRYING OUT THE INVENTION

One embodiment of the present invention will now be described with reference to FIGS. 1 to 5.

Figure 1:
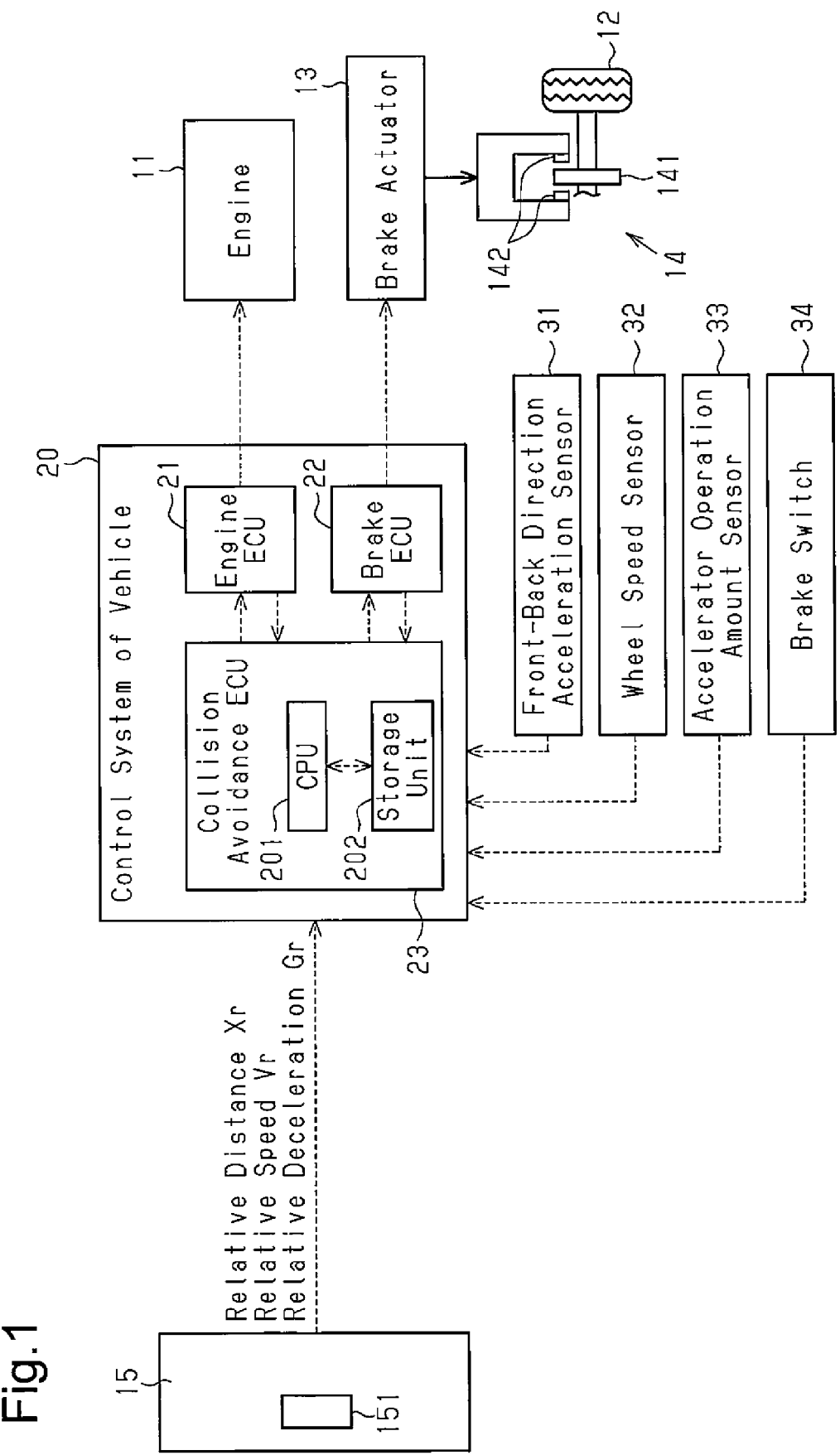
FIG. 1 is a block diagram showing a vehicle having a collision avoidance ECU that is one embodiment of a vehicle travel assist apparatus of the present invention.

As shown in FIG. 1, the vehicle is provided with an engine 11, which outputs power depending on operation of an accelerator operating member by the driver, a brake actuator 13, which actuates to impart brake torque to wheels 12, and a friction-type brake mechanism 14, which is installed for each of the wheels 12. The brake mechanism 14 is provided with a rotating body 141 (such as a rotor), which rotates integrally with the wheel 12 and a friction material 142 (such as a pad), which is positioned at a position away from the rotating body 141 when the brake mechanism is not in operation. In the above-described brake mechanism 14, when the driver operates the brake or actuates the brake actuator 13, the friction material 142 is brought close to the rotating body 141. When the friction material 142 slidably contacts the rotating body 141, a brake torque depending on a frictional force between the friction material 142 and the rotating body 141 is imparted to the wheel 12.

Further, the vehicle is provided with a collision-avoidance-object recognizing system 15, which recognizes a collision avoidance object that is present ahead of the vehicle in a traveling direction. In the present embodiment, the collision avoidance object includes a preceding vehicle that runs ahead of the host vehicle in the traveling direction, a non-movable object such as a wall installed ahead of the host vehicle in the traveling direction, and objects (for example, a vehicle or a pedestrian) that has suddenly entered the traveling route of the vehicle.

The collision-avoidance-object recognizing system 15 includes a radar system, which uses radar and millimeter waves and a stereo-image processing system. The above-described collision-avoidance-object recognizing system 15 is provided with a monitoring unit 151 such as a camera, a radar, and a sensor, which are installed at a position at which it is possible to monitor the view ahead of the host vehicle in the traveling direction.

Upon recognition of a collision avoidance object by the monitoring unit 151, the collision-avoidance-object recognizing system 15 measures a relative distance Xr between the host vehicle and the collision avoidance object, a relative speed Vr of the vehicle with reference to the collision avoidance object, and a relative deceleration Gr of the host vehicle with reference to the collision avoidance object at a predetermined interval set in advance based on monitoring results by the monitoring unit 151. Then, each time the relative distance Xr, the relative speed Vr and the relative deceleration Gr are measured, the collision-avoidance-object recognizing system 15 transmits relative information on the relative distance Xr, the relative speed Vr and the relative deceleration Gr to a control system 20 of the vehicle. The relative speed Vr is a value corresponding to a value obtained by subjecting the relative distance Xr to time differentiation. Further, the relative deceleration Gr is a value corresponding to a value obtained by subjecting the relative speed Vr to time differentiation.

The control system 20 receives the relative information at a predetermined interval from the collision-avoidance-object recognizing system 15. The above-described control system 20 is electrically connected with a front-back direction acceleration sensor 31, which detects a front-back direction deceleration (hereinafter, simply referred to as deceleration) of the host vehicle and a wheel speed sensor 32, which detects a wheel speed of the wheel 12. Further, the control system 20 is electrically connected with an accelerator operation amount sensor 33, which detects an amount of operation of the accelerator operating member by the driver and a brake switch 34, which detects whether the driver operates the brake.

The control system 20 is provided with a plurality of electronic control units (ECUs), each of which has a CPU 201 and a storage unit 202 composed of a ROM, a RAM, a non-volatile memory and the like. The above-described ECUs include an engine ECU 21, a brake ECU 22, and a collision avoidance ECU 23 as an example of the travel assist apparatus.

The engine ECU 21 manages various controls of the engine 11 such as fuel injection control and adjustment/control of an intake amount. The engine ECU 21 calculates an accelerator operation amount based on a signal detected by the accelerator operation amount sensor 33 and transmits information on the accelerator operation amount to other ECUs.

The brake ECU 22 manages adjustment/control of a brake torque applied to the host vehicle and adjustment/control of a brake torque for each of the wheels 12. The brake ECU 22 calculates the speed of the host vehicle based on a signal detected by at least one of the wheel speed sensors 32 of the respective wheel speed sensors 32 installed on the respective wheels 12, and the deceleration of the host vehicle based on a signal detected by the front-back direction acceleration sensor 31. Then, the brake ECU 22 transmits to the other ECUs information on whether or not the brake is operated in addition to information on the thus calculated vehicle speed and deceleration. The thus calculated deceleration is a positive value when the host vehicle is reduced in speed, while the deceleration is a negative value when the vehicle is increased in speed.

Travel information on the accelerator operation amount, the vehicle speed, and the deceleration is calculated at an interval that is shorter than a predetermined interval at which the relative distance Xr, the relative speed Vr, and the relative deceleration Gr are measured by the collision-avoidance-object recognizing system 15.

Next, a description will be given of one example of a method for avoiding collision between a host vehicle and a collision avoidance object with reference to FIG. 2. The collision avoidance object is assumed to be a preceding vehicle C2, which runs ahead of a host vehicle C1 in the traveling direction and a relative distance Xr between the host vehicle C1 and the preceding vehicle C2 is assumed to become shorter due to sudden stop of the preceding vehicle C2.

Figure 2:
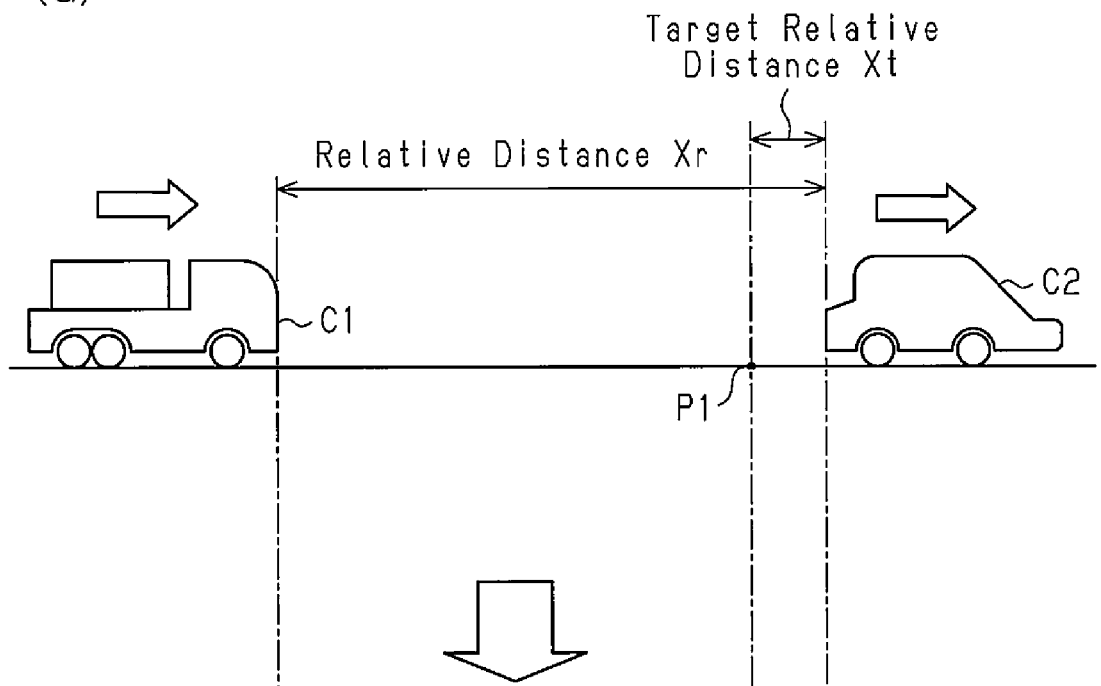
FIG. 2 is a diagram showing avoidance of collision between a host vehicle and a preceding vehicle by performing brake control.
Figure 2:
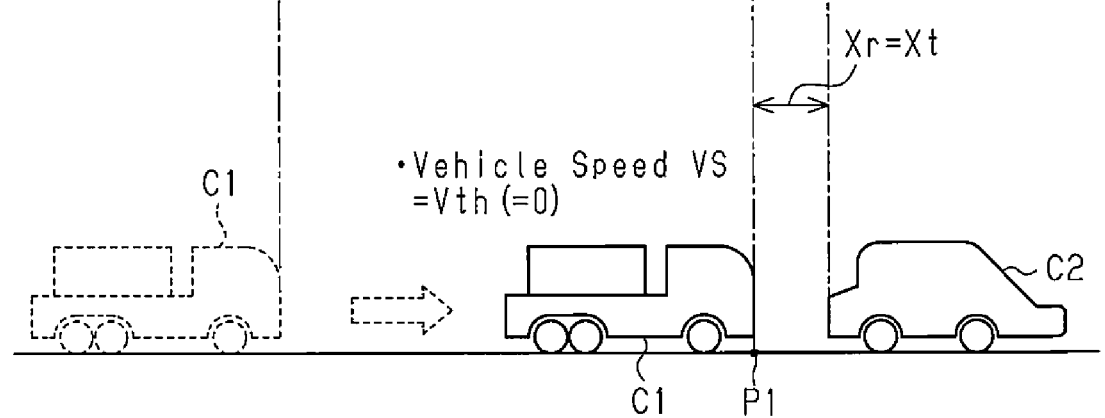

As shown in section (a) of FIG. 2, when the host vehicle C1 and the preceding vehicle C2 run at the same vehicle speed VS, in other words, when the relative speed Vr of the host vehicle C1 with reference to the preceding vehicle C2 is 0 (zero), there is no change in the relative distance Xr. However, when the host vehicle C1 runs at a constant speed and the preceding vehicle C2 is reduced in speed to stop, the relative speed Vr of the host vehicle C1 with reference to the preceding vehicle C2 is greater than 0 (zero). As a result, the relative distance Xr quickly becomes short.

Then, when the collision avoidance ECU 23 of the host vehicle C1 determines that there is a high probability of collision between the host vehicle C1 and the preceding vehicle C2, the host vehicle C1 starts to perform brake control as one example of speed-reduction control. For example, as shown in section (b) of FIG. 2, a target position P1 is set to be behind only by a target relative distance Xt (for example, 1 meter) from the preceding vehicle C2, and a target relative deceleration is set such that the relative speed Vr becomes a specified speed Vth (0 (zero) in the present embodiment) around the target position P1. That is, the brake control is performed such that the vehicle speed VS of the host vehicle C1 is 0 (zero) at the thus set target position P1.

In order to stop the host vehicle C1 in the vicinity of the target position P1 by performing the above-described brake control, an estimated value of travel distance of the host vehicle C1 from the start of the brake control to the stop of the host vehicle C1 is calculated to set a timing of starting the brake control based on the estimated value of the travel distance. That is, the speed reduction distance, which is the estimated value of travel distance, is calculated accurately, so that the brake control is started at an appropriate timing.

Next, a description will be given of operation of the host vehicle C1, which starts the brake control with reference to the timing chart of FIG. 3. In addition, the preceding vehicle C2 is supposed to have stopped before the first time point t1.

Figure 3:
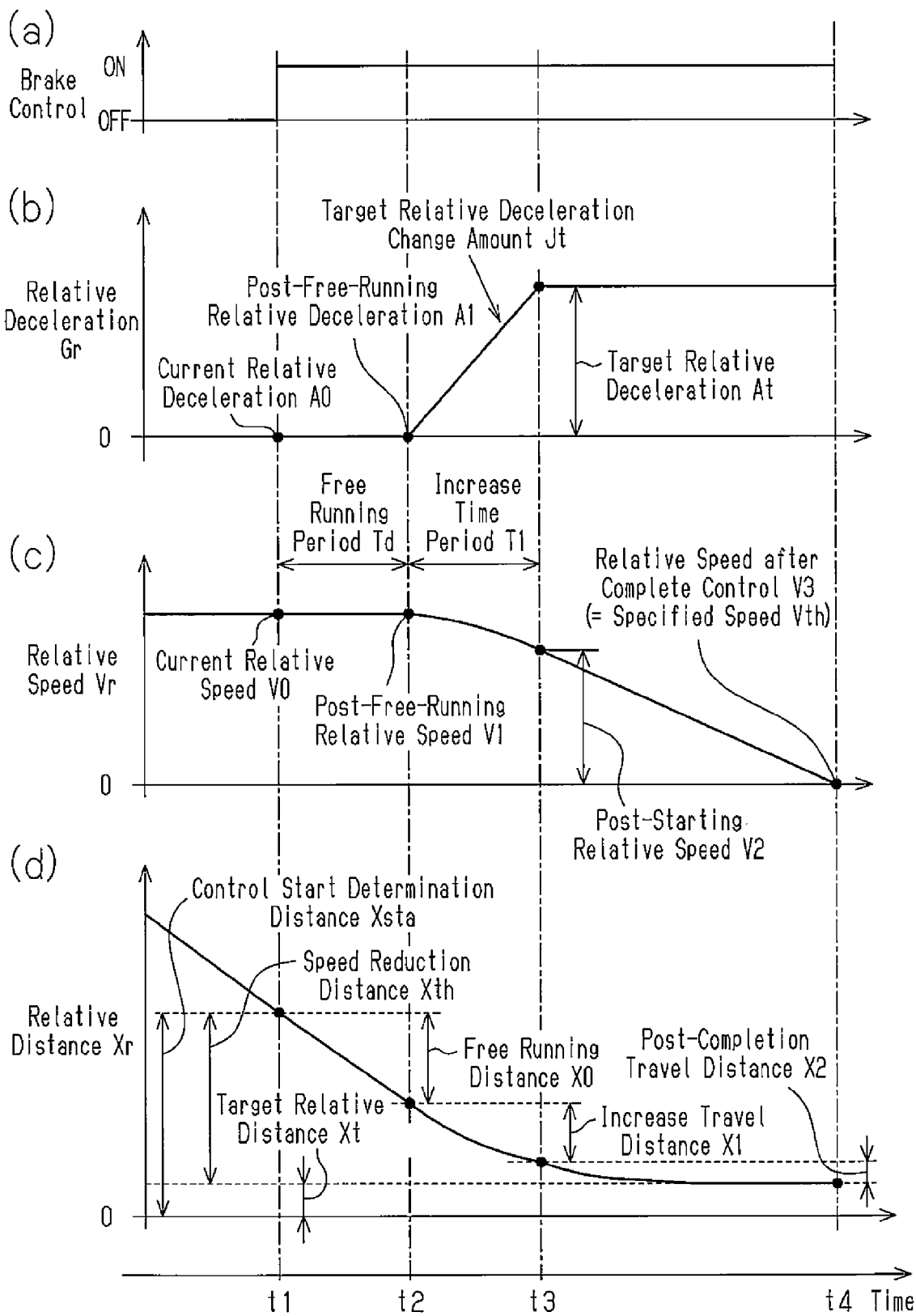
FIG. 3 is a timing chart showing changes in relative deceleration, relative speed, and a relative distance on the assumption that brake control is started.

As shown in sections (a) and (d) of FIG. 3, when a relative distance Xr between the host vehicle C1 and the preceding vehicle C2 becomes short, it is determined that the host vehicle C1 may collide with the preceding vehicle C2, and the brake control is started (first time point t1). However, until time elapses from the first time point t1 to the second time point t2, the deceleration of the host vehicle C1 is kept constant. At this time, since the vehicle speed and the deceleration of the preceding vehicle C2 are constant, there is no change in the relative deceleration Gr as shown in section (b) of FIG. 3. This is due to the fact that some time lag takes place between the start of the brake control and the start of increase in the actual deceleration of the host vehicle C1 in association with a response speed of the brake actuator 13 installed in the host vehicle C1. In addition, the example shown in FIG. 3 shows a case in which the relative deceleration Gr at the first time point t1 is 0 (zero). Therefore, in a period of time from the first time point t1 to the second time point t2, the relative speed Vr is kept at the relative speed at the first time point t1.

After elapse of the second time point t2, the deceleration G of the vehicle starts increasing by performance of brake control. Then, as shown in sections (b) and (c) of FIG. 3, the relative deceleration Gr begins to increase at a target relative deceleration change amount Jt, and the relative speed Vr becomes low according to a change in the relative deceleration Gr. At a third time point t3, at which the relative deceleration Gr reaches a target relative deceleration At, the relative speed Vr becomes a post-starting relative speed V2 and the relative deceleration Gr is kept at the target relative deceleration At. Therefore, at the third time point t3 and thereafter, the relative speed Vr becomes low at a constant gradient. Subsequently, a relative speed after control termination V3, which is a relative speed Vr at a fourth time point t4, at which the host vehicle C1 reaches the target position P1, becomes a specified speed Vth (0 (zero) in the present embodiment). As a result, a collision is avoided between the host vehicle C1 and the preceding vehicle C2.

In the present embodiment, an estimated value during a period of time from the first time point t1 to the second time point t2, in other words, during a period of time in which, after performance of brake control, the deceleration of the host vehicle C1 begins to increase by performance of the brake control, is referred to as a free running period Td. Then, an estimated value of travel distance of the host vehicle C1 at the free running period Td is referred to as a free running distance X0.

Further, in the present embodiment, an estimated value during a period of time from the second time point t2 to the third time point t3, in other words, during a period of time from the beginning of increase in the relative deceleration Gr by performance of brake control to when the relative deceleration Gr reaching the target relative deceleration At is referred to as an increase time period T1. Then, the estimated value of travel distance of the host vehicle C1 at the increase time period T1 is referred to as an increase travel distance X1. Still further, in the present embodiment, the estimated value of travel distance of the host vehicle C1 from the third time point t3 to the fourth time point t4 is referred to as a "post-completion travel distance X2."

Further, when the first time point t1 is defined as the current time point, the relative speed at the first time point t1 is referred to as a current relative speed V0, and the relative deceleration at the first time point t1 is referred to as a current relative deceleration A0. Still further, the estimated value of relative speed at the second time point t2 after elapse of the free running period Td from the first time point t1 is referred to as a post-free-running relative speed V1, and the estimated value of relative deceleration at the second time point t2 is referred to as a post-free-running relative deceleration A1. The post-free-running relative deceleration A1 is the same value as the current relative deceleration A0.

Further, when the first time point t1 is defined as the current time point, a time point at which the free running period Td and the increase time period T1 have passed from the first time point t1 corresponds to the third time point t3. The post-starting relative speed V2, which is an estimated value of the relative speed at the third time point t3, corresponds to a relative speed at the third time point.

Next, a description will be given of various types of process routines that are performed by the collision avoidance ECU 23 on determination of a timing of starting the above-described brake control.

First, a description will be given of a process routine performed by the collision avoidance ECU 23 with reference to the flowchart shown in FIG. 4.

Figure 4:
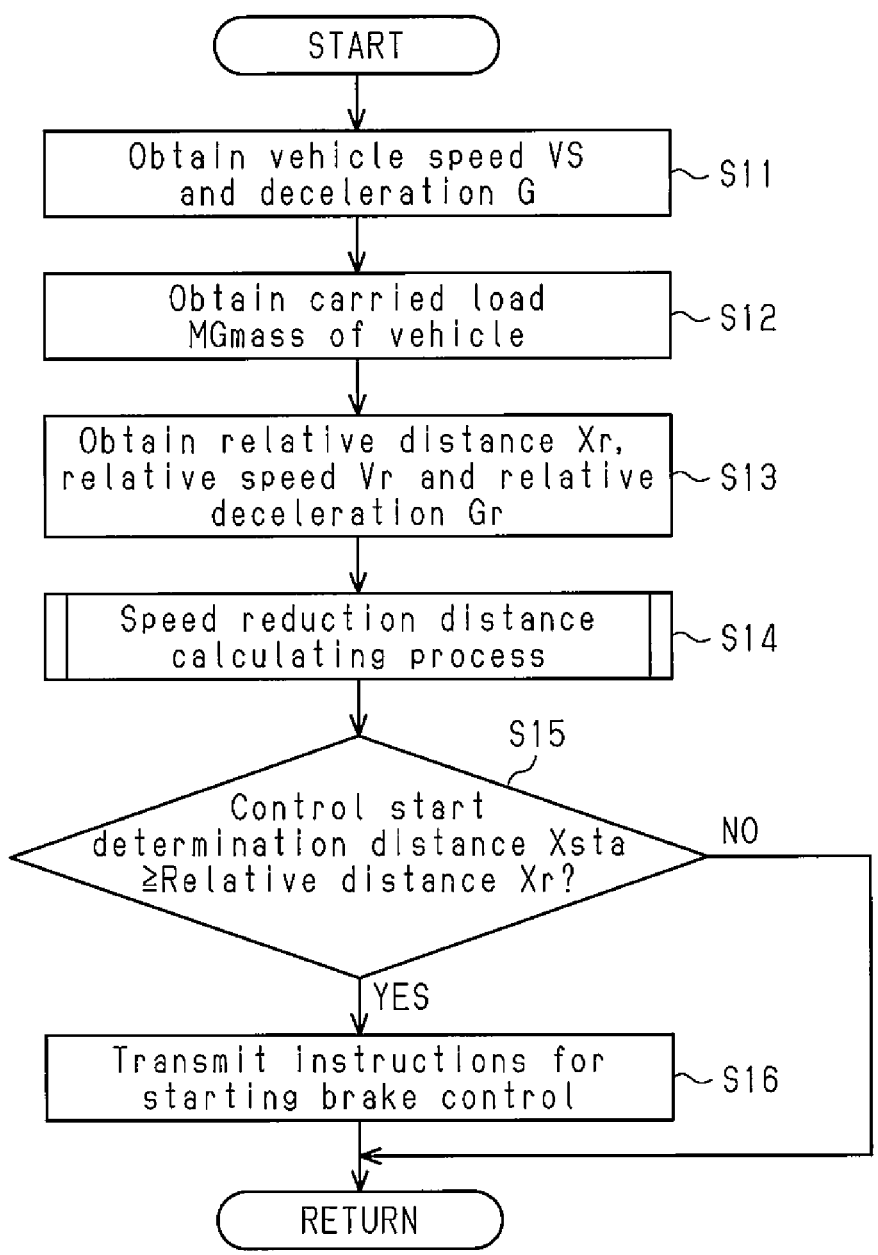
FIG. 4 is an explanatory flowchart showing a process routine performed by the collision avoidance ECU to avoid collision between the host vehicle and a collision avoidance object.

The process routine shown in FIG. 4 is performed at predetermined interval. In this process routine, the collision avoidance ECU 23 obtains a vehicle speed VS and a deceleration G of the host vehicle C1 calculated by a brake ECU 22 (Step S11). It is acceptable that the deceleration G obtained here is a value based on a detection signal from the front-back direction acceleration sensor 31 or a value obtained by multiplying by −1 a vehicle speed change amount obtained by subjecting the vehicle speed VS to time differentiation. Thereafter, the collision avoidance ECU 23 obtains a carried load MGmass of the host vehicle C1 (Step S12). In addition, a method for obtaining the carried load MGmass will be described below.

Then, the collision avoidance ECU 23 obtains the latest relative distance Xr, relative speed Vr, and relative deceleration Gr measured by a collision avoidance object recognizing system 15 (Step 13) and performs a speed reduction distance calculating process, which will be described in detail in FIG. 5 (Step S14). In this speed reduction distance calculating process, there are calculated (are obtained) the speed reduction distance Xth, which is an estimated value of a distance traveled by the host vehicle C1 until the time the vehicle speed VS of the host vehicle C1 becomes equal to or less than a specified speed Vth on the assumption that brake control is started from a current time point (refer to FIG. 3), and the control start determination distance Xsta, which is obtained by adding a target relative distance Xt to the speed reduction distance Xth.

Then, the collision avoidance ECU 23 determines whether or not the relative distance Xr obtained in Step S13 is equal to or less than the control start determination distance Xsta calculated in Step S14 (Step S15). In a case where the relative distance Xr is longer than the control start determination distance Xsta (Step S15: NO), it can be determined that the host vehicle C1 is still unlikely to collide with a collision avoidance object. Therefore, the collision avoidance ECU 23 temporarily suspends this process routine. On the other hand, in a case where the relative distance Xr is equal to or less than the control start determination distance Xsta (Step S15: YES), it can be determined that the host vehicle C1 is likely to collide with the collision avoidance object. Therefore, the collision avoidance ECU 23 transmits instructions for starting the brake control to the engine ECU 21 and the brake ECU 22 (Step S16) and temporarily suspends this process routine. Then, the engine ECU 21, which has received the instructions, controls an engine 11 to reduce output from the engine 11. Further, the brake ECU 22, which has received the instructions, controls a brake actuator 13 to increase the brake torque applied to the vehicle.

Here, a description will be given of an example of a method for obtaining the carried load MGmass of the host vehicle.

The vehicle is less likely to be accelerated when the vehicle is traveling with a greater value of the carried load MGmass than when traveling with a lower value of the carried load MGmass. That is, even if the output from the engine 11 is the same, the vehicle is accelerated to a lesser extent when the carried load MGmass is greater than when the carried load MGmass is small.

Therefore, when the vehicle is shifted from a stopped state, in which the vehicle is stopped, to a starting state, in which the brake operation is cancelled and the accelerator operation is started, the collision avoidance ECU 23 obtains the amount of accelerator operation (or output from the engine 11) and the acceleration of the vehicle at the time point when the amount of accelerator operation is detected. Then, the collision avoidance ECU 23 carries out estimating computation of the carried load MGmass based on the relationship between the thus obtained amount of accelerator operation and the acceleration. At this time, if the acceleration is small in relation to the amount of accelerator operation, the carried load MGmass is determined to be great. If the acceleration is great in relation to the amount of accelerator operation, the carried load MGmass is determined to be small.

Next, a description will be given of the speed reduction distance calculating process in the above-described Step S14 (speed reduction distance calculating process routine) by referring to the flowchart shown in FIG. 5.

Figure 5:
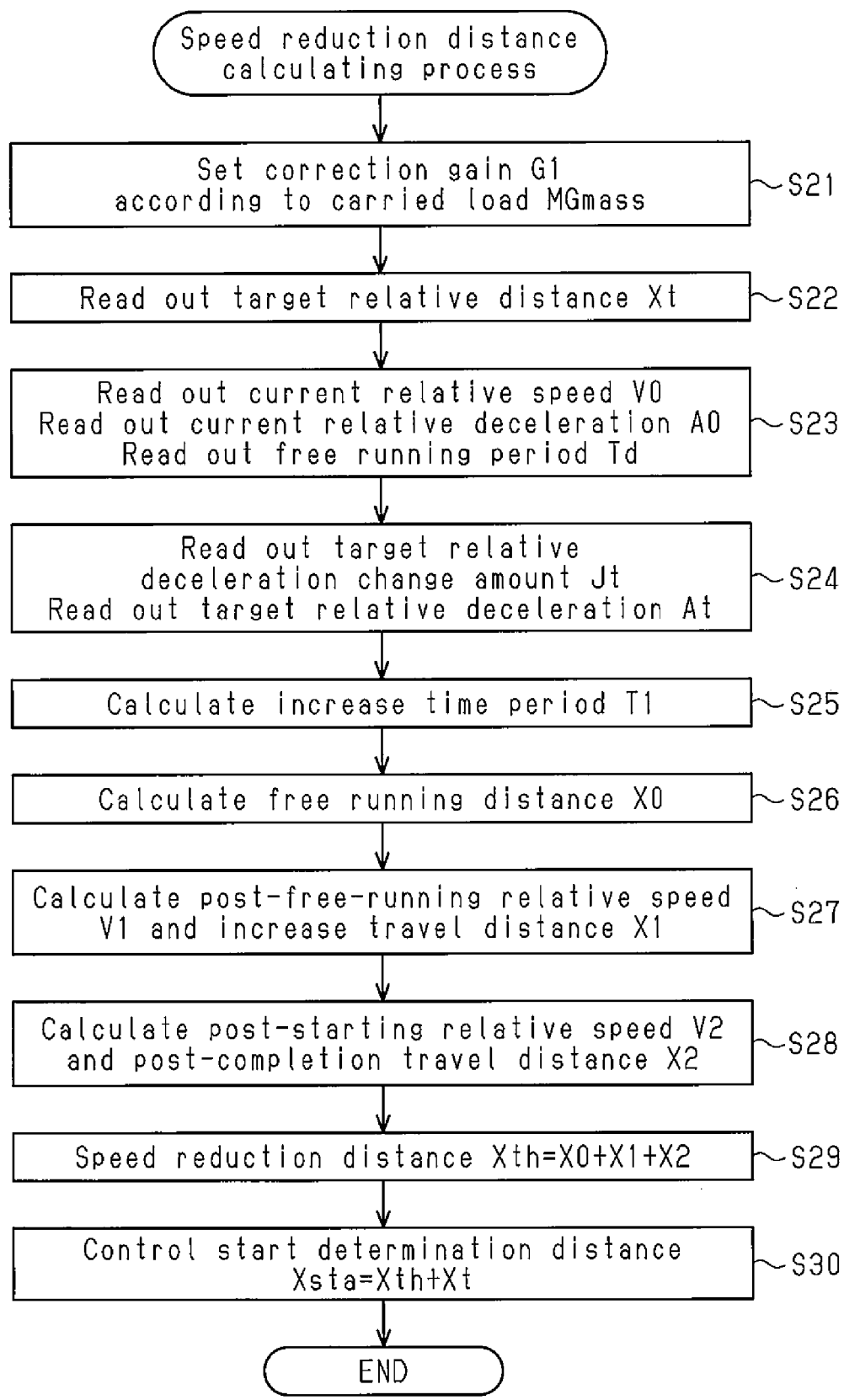
FIG. 5 is an explanatory flowchart showing a speed reduction distance calculating process routine.

In the speed reduction distance calculating process routine as shown in FIG. 5, the collision avoidance ECU 23 sets a correction gain G1 according to the carried load MGmass obtained in the above-described Step S12 (Step S21). The correction gain G1 is set to be a value equal to or greater than 1 and set to be a greater value as the carried load MGmass increases. Thereafter, the collision avoidance ECU 23 reads out the target relative distance Xt from a storage unit 202 (Step S22). Then, the collision avoidance ECU 23 reads out a current relative speed V0, a current relative deceleration A0 and a free running period Td from the storage unit 202 (Step S23). The free running period Td is set in advance based on the performance of the brake actuator 13 installed in the vehicle.

Then, the collision avoidance ECU 23 reads out a target relative deceleration change amount Jt and the target relative deceleration At from the storage unit 202 (Step S24). In addition, the target relative deceleration change amount Jt and the target relative deceleration At are set to be a smaller value than the performance limit of the brake actuator 13. Thereafter, the collision avoidance ECU 23 calculates the increase time period T1 by using the relational expression 2 given below (Step S25). In the present embodiment, on the assumption that the relative deceleration Gr is changed in a constant gradient during the increase time period T1, the increase time period T1 is calculated based on the target relative deceleration change amount Jt, the target relative deceleration At, and the current relative deceleration A0.

$$T1=(At-A0)/Jt \quad \text{(Expression 2)}$$

Subsequently, the collision avoidance ECU 23 calculates the free running distance X0 by using the relational expression 3 (Step S26), and the post-free-running relative speed V1 and the increase travel distance X1 are calculated by using the relational expressions 4 and 5 given below (Step S27). That is, in the present embodiment, on the assumption that the relative deceleration Gr is constant during a free running period, the free running distance X0 is calculated based on the current relative speed V0, the current relative deceleration A0, and the free running period Td. Further, on the assumption that the relative deceleration Gr is constant in the current relative deceleration A0 during the free running period, the post-free-running relative speed V1 is calculated based on the current relative speed V0, the current relative deceleration A0 and the free running period Td. Still further, on the assumption that the relative deceleration Gr is changed at a constant gradient up to the target relative deceleration At during the increase time period, the increase travel distance X1 is calculated based on the post-free-running relative speed V1, the current relative deceleration A0, the increase time period T1, and the target relative deceleration change amount Jt. However, during the free running period, a value (Td×G1) is used that has been corrected according to the carried load MGmass. During the increase time period, a value (T1×G1) is used that has been corrected according to the carried load MGmass.

Then, the collision avoidance ECU 23 calculates the post-starting relative speed V2 and the post-completion travel distance X2 by using the relational expressions 6 and 7 given below (Step S28). That is, in the present embodiment, on the assumption that the relative deceleration Gr is changed at a constant gradient during the increase time period, the post-starting relative speed V2 is calculated based on the post-free-running relative speed V1, the current relative deceleration A0, the increase time period T1 and the target relative deceleration change amount Jt. Further, on the assumption that the relative deceleration Gr is constant at the target relative deceleration At, the post-completion travel distance X2 is calculated based on the post-starting relative speed V2 and the target relative deceleration At. However, during the increase time period, there is used a value (=T1×G1) corrected according to the carried load MGmass.

Thereafter, the collision avoidance ECU 23 calculates the speed reduction distance Xth based on the relational expression 8 given below (Step S29). The speed reduction distance Xth is obtained based on addition results of the free running distance X0, the increase travel distance X1, and the post-completion travel distance X2. Then, the collision avoidance ECU 23 adds the target relative distance Xt to the speed reduction distance Xth calculated in Step S29 and uses the addition result as the control start determination distance Xsta (Step S30). Thereafter, the collision avoidance ECU 23 terminates the speed reduction distance calculating process routine.

$$X0=(V0-A0\times(Td\times G1))\times(Td\times G1) \quad \text{(Expression 3)}$$

$$V1=V0-A0\times(Td\times G1) \quad \text{(Expression 4)}$$

$$X1=V1\times(T1\times G1)-(A0\times(T1\times G1)^2)/2-(Jt\times(T1\times G1)^3)/6 \quad \text{(Expression 5)}$$

$$V2=V1-A0\times(T1\times G1)-(Jt\times(T1\times G1)^2)/2 \quad \text{(Expression 6)}$$

$$X2=V2^2/(2\times At) \quad \text{(Expression 7)}$$

$$Xth=X0+X1+X2 \quad \text{(Expression 8)}$$

As described above, the present embodiment has the following advantages.

(1) In the present embodiment, it is assumed that even after start of the brake control, the relative deceleration Gr is constant during the free running period Td and it is also assumed that after elapse of the free running period Td, the relative deceleration Gr is increased at a constant gradient. Then, under these assumptions, the free running distance X0 and the increase travel distance X1 are calculated. Further, after elapse of the free running period Td and the increase time period T1, the post-completion travel distance X2 is calculated on the assumption that the relative deceleration Gr is constant at the target relative deceleration At. Then, the speed reduction distance Xth is calculated based on addition results of the thus calculated free running distance X0, the increase travel distance X1, and the post-completion travel distance X2. Accordingly, as compared with a case in which the speed reduction distance is calculated based on the above-described relational expression 1, it is possible to calculate, with improved accuracy, the speed reduction distance Xth and the control start determination distance Xsta calculated based on the speed reduction distance Xth, due to the fact that the speed reduction distance Xth is calculated, while taking into consideration the time lag between the start of brake control and the start of an actual increase in deceleration G of the vehicle.

(2) In the present embodiment, the speed reduction distance Xth is calculated to be longer when a great amount of the carried load MGmass of the host vehicle C1 is obtained and the vehicle is traveling than when the vehicle is traveling with a small amount of the carried load MGmass. As described above, the speed reduction distance Xth is obtained while taking into consideration the carried load MGmass, thus making it possible to lead the speed reduction distance Xth according to the speed reduction characteristics of the host vehicle C1 at that time.

(3) That is, when the carried load MGmass is great, time in which the host vehicle C1 begins to reduce the speed by the start of brake control is likely to be long. Thus, in the present embodiment, the free running period Td is corrected by the correction gain G1 and the free running distance X0 is calculated based on the free running period after correction (Td×G1). As a result, the free running distance X0 is calculated while taking into consideration the carried load MGmass, thus making it possible to calculate the speed reduction distance Xth with improved accuracy.

(4) Further, the actual change amount of the relative deceleration Gr during the increase time period T1 is likely to be smaller than the target relative deceleration change amount Jt as the carried load MGmass increases. In other words, a period of time from the beginning of increase in the relative deceleration Gr by performance of brake control to when the relative deceleration Gr reaches the target relative deceleration At is likely to be longer. Thus, in the present embodiment, the increase time period T1 is corrected by the correction gain G1, and the increase travel distance X1 is calculated based on the increase time period after correction (T1×G1). As a result, the increase travel distance X1 is calculated while taking into consideration the carried load MGmass, thus making it possible to calculate the speed reduction distance Xth with improved accuracy.

(5) Further, if the carried load MGmass is great, there is a probability that the relative deceleration Gr after elapse of the increase time period T1 may be constant at a value smaller than the target relative deceleration At. Thus, in the present embodiment, a value corrected based on the carried load MGmass is calculated as the post-completion travel distance X2. It is, thereby, possible to calculate the speed reduction distance Xth with improved accuracy.

(6) As described so far, the speed reduction distance Xth can be calculated with improved accuracy, so that the target relative distance Xt can be set to be the smallest possible value (for example, 1 meter). It is, thereby, possible to suppress an early start of brake control while the host vehicle C1 is traveling.

The above described embodiment may be modified as follows.

Correction according to the carried load MGmass may be made only in relation to any one of the post-completion travel distance X2, the increase travel distance X1, and the free running distance X0.

The post-free-running relative deceleration A1, the post-free-running relative speed V1 and the free running distance X0 may be calculated without assuming that the relative deceleration Gr during the free running period Td is constant in the current relative deceleration A0. For example, if it is possible to obtain the current acceleration change amount J0, which is a change amount of the relative deceleration between the host vehicle C1 at the first time point t1 and a collision avoidance object, the post-free-running relative deceleration A1, the post-free-running relative speed V1 and the free running distance X0 may be calculated by using relational expressions 9, 10, and 11 given below.

Even in the above-described case, the free running period Td may be corrected with the correction gain G1 and the free running period after correction (Td×G1) may be substituted for Td in the relational expressions 9, 10 and 11. Thereby, the speed reduction distance Xth and the control start determination distance Xsta can be given as appropriate values while taking into consideration the carried load MGmass of the vehicle at that time.

Further, on the assumption that the relative deceleration Gr is changed even during the above-described free running period, it is acceptable that on calculation of the increase time period T1, the post-free-running relative deceleration A1 may be substituted into the above-described relational expression 2, in place of the current relative deceleration A0.

$$A1 = A0 + J0 \times Td \quad \text{(Expression 9)}$$

$$V1 = V0 - A0 \times Td - (J0 \times Td^2)/2 \quad \text{(Expression 10)}$$

$$X0 = V0 \times Td - (A0 \times Td^2)/2 - (J0 \times Td^3)/6 \quad \text{(Expression 11)}$$

A method different from the above-described embodiment may be used to correct the speed reduction distance Xth according to the carried load MGmass. For example, the free running distance X0, the increase travel distance X1, and the post-completion travel distance X2 may be calculated without considering the carried load MGmass to obtain an addition result (X0+X1+X2), the result thereof may be multiplied by the correction gain G1 according to the carried load MGmass. In this case, the thus obtained computation result is defined as the speed reduction distance Xth.

In a vehicle that hardly changes in speed reduction characteristics due to the carried load MGmass, no correction may be made according to the carried load MGmass on calculation of the speed reduction distance Xth.

The target relative distance Xt may be changed according to various conditions.

The brake control is likely to be followed more slowly, for example, when the host vehicle C1 is carries a great amount of the in carried load MGmass than when the vehicle carries a small amount of the carried load MGmass. Thus, the target relative distance Xt may be set to be a greater value when the vehicle carries a great amount of the carried load MGmass than when the vehicle carries a small amount of the carried load MGmass. It is, thereby, possible to ensure that a sufficient distance is kept with respect to a collision avoidance object even if intervals vary between the target position P1 and the actual termination position of the brake control.

Further, when the relative speed Vr is low in a case in which the host vehicle C1 follows the preceding vehicle C2 as one example of the collision avoidance object and if speed-reduction control is started by slightly changing the relative speed Vr, the driver may feel an uncomfortable sensation. Thus, the target relative distance Xt may be set to be a smaller value when the relative speed Vr is low before the start of the speed-reduction control than when the relative speed Vr is high. Thereby, it is possible to suppress unnecessary start of the speed-reduction control when the relative speed Vr is low in a case in which the host vehicle C1 follows the preceding vehicle C2.

Further, when another vehicle cuts in between the host vehicle C1 and the preceding vehicle C2 while the host vehicle C1 is following the preceding vehicle C2 (hereinafter, the vehicle that has cut in will be referred to as a cutting-in vehicle), a collision avoidance object is switched from the preceding vehicle C2 to the cutting-in vehicle. In this case, if the relative distance between the host vehicle C1 and the cutting-in vehicle is smaller than the control start determination distance Xsta, which was obtained when the collision avoidance object was the preceding vehicle C2, sudden braking may be applied to the host vehicle C1 to reduce the relative speed Vr to 0 (zero) at the target position P1 set behind the cutting-in vehicle. Therefore, the target relative distance Xt may be set to be a smaller value when the relative distance Xr is short before the start of speed-reduction control than when the relative distance Xr is long. Thereby, if the relative distance Xr in relation to the collision avoidance object is suddenly short in a case in which the cutting-in vehicle cuts in between the host vehicle C1 and the preceding vehicle C2, the distance between the host vehicle C1 and the target position P1 is likely to be long, as compared with a case in which the target relative distance Xt is not changed. Therefore, even if the speed-reduction control is started due to the fact that the cutting-in vehicle cuts in between the host vehicle C1 and the preceding vehicle C2, it is possible to suppress a brake torque applied to the host vehicle C1 at that time from being extremely great.

In the brake mechanism 14, the friction material 142 is brought close to the rotating body 141 and in contact therewith in a sliding manner at the time of brake application, thereby causing frictional force between the friction material and the rotating body. Then, a brake torque according to the frictional force is imparted to the wheel 12. In the thus configured brake mechanism 14, there is a case in which an interval between the rotating body 141 and the friction material 142 may be changed at the time of non-brake application. Therefore, on performance of the above-described brake control, the free running period Td is likely to be longer when the interval is wide than when it is narrow. Thus, the free running period Td may be corrected according to the interval, if the above-described interval can be detected or estimated. It is, thereby, possible to calculate the speed reduction distance Xth with improved accuracy.

The method for estimating the above-described interval includes the following method. For example, when the driver operates the brake, a period of time is measured from the beginning of brake operation to the start of reduction in the speed of the wheels 12, thereby giving a greater estimated value to the interval with an increase in period of time.

The control start determination distance Xsta may be obtained by multiplying the speed reduction distance Xth by a calculation gain value set in advance (a value greater than 1, for example, 1.2).

The speed-reduction control may be performed only when the driver does not operate the brake. Also, the speed-reduction control may be performed not only when the driver does not operate the brake but also when the driver operates the brake. When the speed-reduction control is performed on brake operation, the brake actuator 13 is controlled so that the relative deceleration Gr is brought close to the target relative deceleration At. That is, the brake actuator 13 is controlled in such a manner that the total brake torque composed of the brake torque based on brake operation by the driver and the brake torque based on actuation of the brake actuator 13 is the brake torque according to the target relative deceleration At.

It is acceptable that the speed-reduction control is control including driving control adjusting a driving torque to a wheel, in addition to brake control that adjusts brake torque to the host vehicle C1.

It is acceptable that the collision-avoidance-object recognizing system 15 is not able to measure the relative speed Vr or the relative deceleration Gr as long as it has functions to measure the relative distance Xr. In this case, it is acceptable that the collision avoidance ECU 23 uses a relative distance Xr obtained from the collision-avoidance-object recognizing system 15 to calculate the relative speed Vr and the relative deceleration Gr.

It is acceptable that when the relative speed Vr is made less than or equal to the specified speed Vth to the target position P1 set ahead of the host vehicle C1 in the traveling direction, the speed-reduction control is performed in a case other than avoidance of collision between the host vehicle C1 and a collision avoidance object. For example, when the vehicle passes through a toll gate of a toll road, the target position P1 is set in front of the toll gate and the speed-reduction control is performed such that on passage through the target position P1, the relative speed Vr (in this case, the speed of the vehicle) becomes less than or equal to a specified speed Vth. In this case, the specified speed Vth may be set to be a value greater than 0 (zero) (for example, 20). In this case, a toll gate corresponds to an object.

It is acceptable that the travel assist apparatus is used as the brake ECU 22 and the engine ECU 21, for example.

The technical ideas obtainable from the above illustrated embodiment and the modifications other than those disclosed in the claim section will now be described below with their advantages.

(A) The free running distance (X0) is preferably made longer when the vehicle is traveling with a great amount of the carried load (MGmass) than when the vehicle is traveling with a small amount of the carried load (MGmass).

A period of time between a time point at which the speed-reduction control is started and a third time point at which an actual deceleration of the vehicle begins to increase, in other words, a free running period, is likely to be longer when the vehicle is traveling with a great amount of the carried load (MGmass) than when the vehicle is traveling with a small amount of the carried load (MGmass). Thus, adoption of the above-described configuration allows the speed reduction distance (Xth) to be calculated based on the calculated free running distance (X0), thereby calculating a speed reduction distance (Xth) according to the speed reduction characteristics of the vehicle at that time.

(B) The increase travel distance (X1) is preferably made longer when the vehicle is traveling with a great amount of the carried load (MGmass) than when the vehicle is traveling with a small amount of the carried load (MGmass).

An actual deceleration of the vehicle on performance of speed-reduction control is likely to increase in a slower gradient when the vehicle is traveling with a great amount of the carried load (MGmass) than when the vehicle is traveling with a small amount of the carried load (MGmass). Thus, the speed reduction distance (Xth) is calculated based on the increase travel distance (X1) calculated by adopting the above-described control mechanism, making it possible to calculate the speed reduction distance (Xth) according to the speed reduction characteristics of the vehicle at that time.

(C) The post-completion travel distance (X2) is preferably made longer when the vehicle is traveling with a great amount of the carried load (MGmass) than when the vehicle is traveling with a small amount of the carried load (MGmass).

In a case in which the vehicle is traveling with a great amount of the carried load (MGmass), even if the third time point is reached, there is a probability that, in reality, the relative deceleration (Gr) does not reach the target relative deceleration (At) or the relative deceleration (Gr) is kept constant at a deceleration smaller than the target relative deceleration (At). Therefore, the post-completion travel distance (X2) is likely to be longer when the vehicle is traveling with a great amount of the carried load (MGmass) than when the vehicle is traveling with a small amount of the carried load (MGmass). Thus, the speed reduction distance (Xth) is calculated based on the post-completion travel distance (X2) calculated by adopting the above-described control mechanism, making it possible to calculate a speed reduction distance (Xth) according to the speed reduction characteristics of the vehicle at that time.

The invention claimed is:

1. A vehicle travel assist apparatus, which performs speed-reduction control in which a relative deceleration of a vehicle with respect to an object present ahead of the vehicle in a traveling direction is increased to a target relative deceleration, thereby calculating a speed reduction distance, which is an estimated value of a travel distance of the vehicle necessary for making a relative speed of the vehicle with respect to the object equal to or less than a specified speed, the vehicle travel assist apparatus comprising:

an electronic control unit that is configured to calculate a free running distance, which is an estimated value of a distance that the vehicle can travel from a first time point to a second time point, the first time point being a point in time at which the speed-reduction control is started, and the second time point being a point in time at which the relative deceleration begins to increase by the start of the speed-reduction control at the first time point, calculate an increase travel distance, which is an estimated value of a distance that the vehicle can travel from the second time point to a third time point at which the relative deceleration reaches the target relative deceleration, calculate a post-completion travel distance, which is an estimated value of a distance that the vehicle can travel from the third time point to a time point at which the relative speed is made equal to or less than the specified speed, and obtain the speed reduction distance based on a result of adding up the free running distance, the increase travel distance, and the post-completion travel distance.

2. The vehicle travel assist apparatus according to claim 1, wherein the electronic control unit is configured to calculate the free running distance based on the relative speed at the first time point, the relative deceleration at the first time point, and a free running period, which is a period of time from the first time point to the second time point.

3. The vehicle travel assist apparatus according to claim 1, wherein the electronic control unit is configured to calculate the increase travel distance based on the relative speed at the second time point, the relative deceleration at the first time point, an increase time period, and a target relative deceleration change amount, the increase time period being a period of time from the second time point to the third time point, and the target relative deceleration change amount being a gradient of change of the relative deceleration at the increase time period.

4. The vehicle travel assist apparatus according to claim 1, wherein the electronic control unit is configured to calculate the post-completion travel distance based on the relative speed at the third time point and the target relative deceleration.

5. The vehicle travel assist apparatus according to claim 1, wherein the speed-reduction control includes control for increasing a brake torque applied to the vehicle, and the electronic control unit is configured to obtain the carried load of the vehicle, and make the speed reduction distance longer when the vehicle is traveling in a state in which the carried load is high than when the vehicle is traveling in a state in which the carried load is low.

6. The vehicle travel assist apparatus according to claim 1, wherein the electronic control unit is configured to obtain a relative distance between the host vehicle and the object, and start the speed-reduction control when the obtained relative distance becomes equal to or less than a control start determination distance, which is based on the obtained speed reduction distance.

7. A vehicle travel assist method, which performs speed-reduction control in which a relative deceleration of a vehicle with respect to an object present ahead of the vehicle in a traveling direction is increased to a target relative deceleration, thereby calculating a speed reduction distance, which is an estimated value of a travel distance of the vehicle necessary for making a relative speed of the vehicle with respect to the object equal to or less than a specified speed, the method comprising:

calculating a free running distance, which is an estimated value of a distance that the vehicle can travel from a first time point to a second time point, the first time point being a point in time at which the speed-reduction control is started, and the second time point being a point in time at which the relative deceleration begins to increase by the start of the speed-reduction control at the first time point, calculating an increase travel distance, which is an estimated value of a distance that the vehicle can travel from the second time point to a third time point at which the relative deceleration reaches the target relative deceleration, calculating a post-completion travel distance, which is an estimated value of a distance that the vehicle can travel from the third time point to a time point at which the relative speed is made equal to or less than the specified speed, and obtaining the speed reduction distance based on a result of adding up the free running distance, the increase travel distance, and the post-completion travel distance.

* * * * *